(12) United States Patent
Emerson et al.

(10) Patent No.: US 8,367,931 B2
(45) Date of Patent: Feb. 5, 2013

(54) SEGMENTED DECOMPRESSION RESISTANT CABLE SPLICE AND METHOD OF INSTALLATION

(76) Inventors: Tod D. Emerson, Cypress, TX (US); James A. Williams, Cypress, TX (US)

( * ) Notice: Subject to any disclaimer, the term of this patent is extended or adjusted under 35 U.S.C. 154(b) by 309 days.

(21) Appl. No.: 12/865,684

(22) PCT Filed: Feb. 2, 2009

(86) PCT No.: PCT/US2009/032853
§ 371 (c)(1),
(2), (4) Date: Sep. 13, 2010

(87) PCT Pub. No.: WO2009/097609
PCT Pub. Date: Aug. 6, 2009

(65) Prior Publication Data
US 2010/0326725 A1    Dec. 30, 2010

Related U.S. Application Data

(60) Provisional application No. 61/025,328, filed on Feb. 1, 2008.

(51) Int. Cl.
*H02G 3/06* (2006.01)

(52) U.S. Cl. .................... 174/84 C; 174/88 R
(58) Field of Classification Search ............... 174/84 C, 174/88 R
See application file for complete search history.

(56) References Cited

U.S. PATENT DOCUMENTS

| | | | | |
|---|---|---|---|---|
| 3,213,186 A | * | 10/1965 | Raila et al. ................. | 174/84 C |
| 4,589,939 A | * | 5/1986 | Mohebban et al. ............ | 156/49 |
| 5,403,977 A | * | 4/1995 | Steptoe et al. .............. | 174/77 R |

\* cited by examiner

*Primary Examiner* — Chau Nguyen
(74) *Attorney, Agent, or Firm* — David B. Dickinson

(57) ABSTRACT

An electrical splice, resistant to decompression failure for use in gassy hydrocarbon wells, is segmented thereby permitting the installation of the splice quickly and efficiently. The segmented cable splice provides a passage into which is inserted an electrical crimping union which provides a detent to engage a ridge on the interior passage of the segmented sleeve. When each sleeve is complete, the exterior surface of the complete splice is either cylindrical or flat; and covered by protective transition covers having epoxy encapsulating each contained conductor line back to the armored cover, thereby providing mechanical protection and inhibiting movement of the spliced conductors within the splice connection.

11 Claims, 5 Drawing Sheets

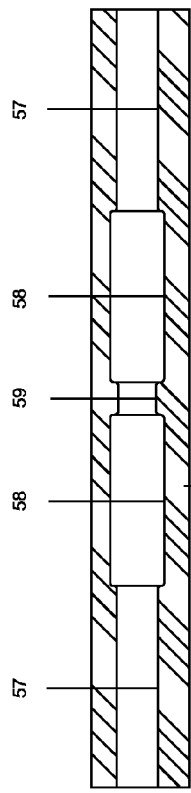
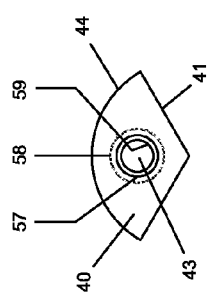
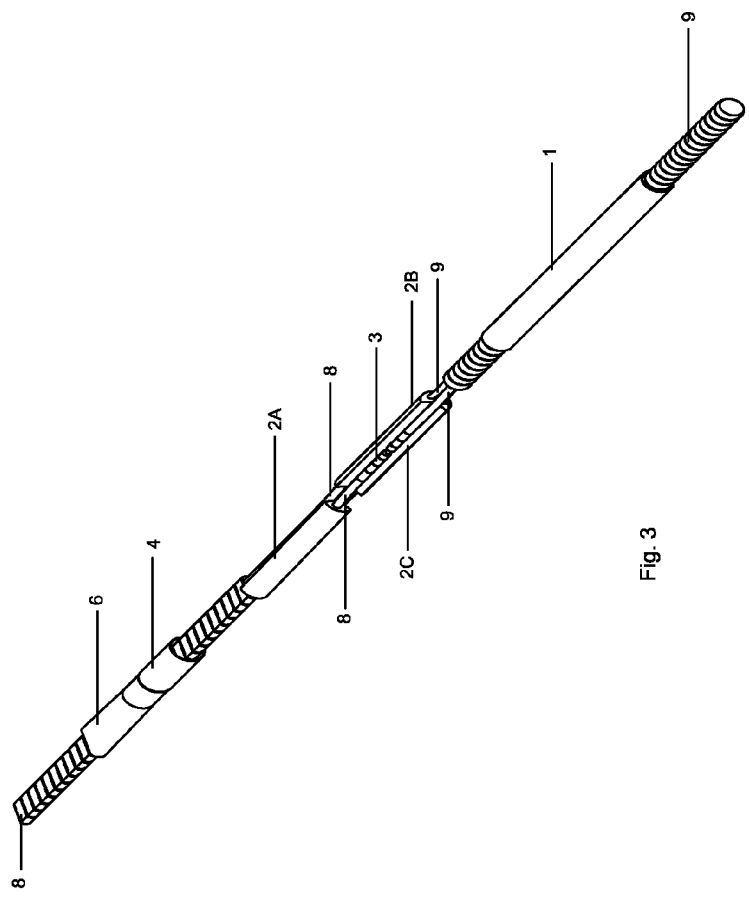

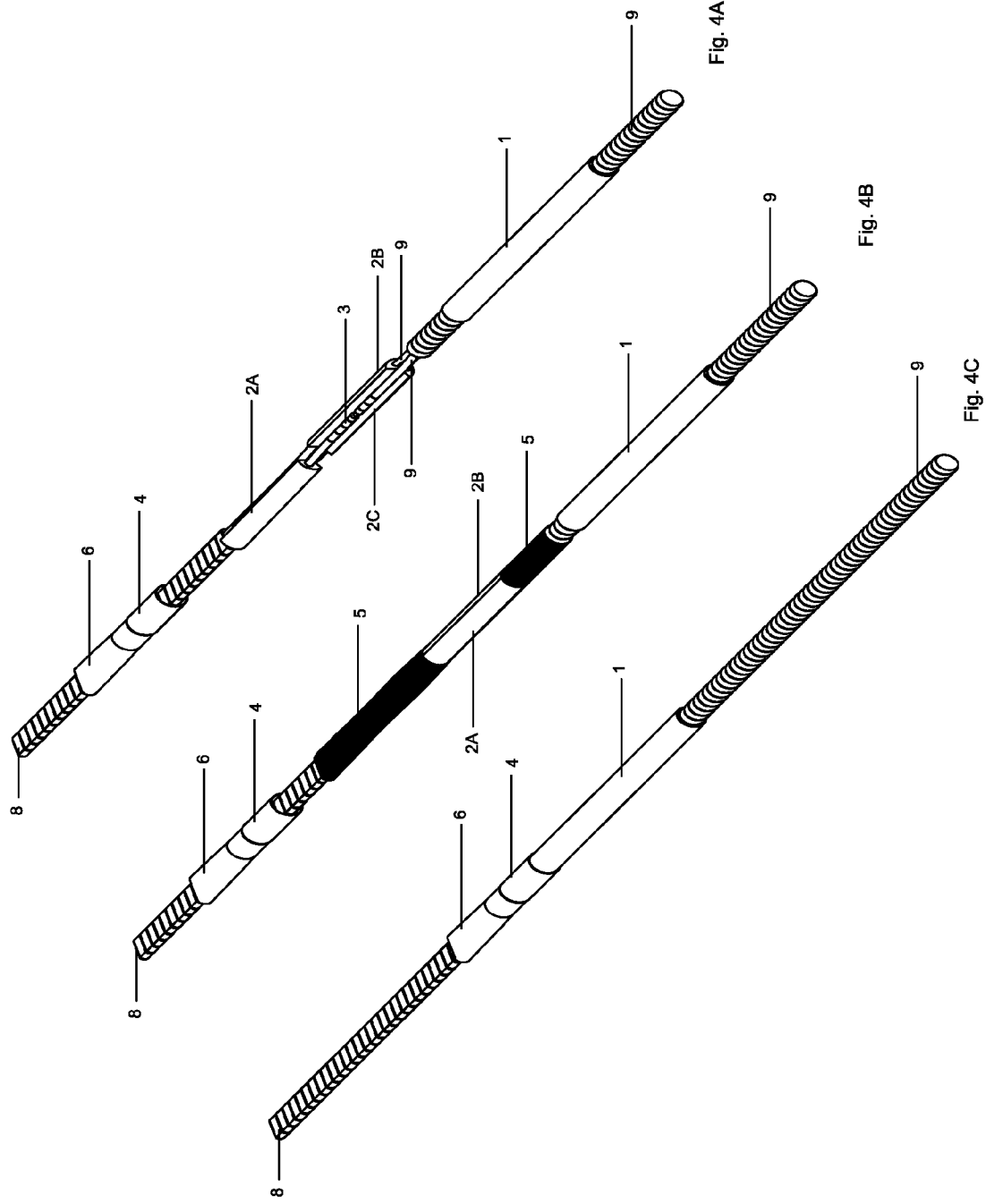

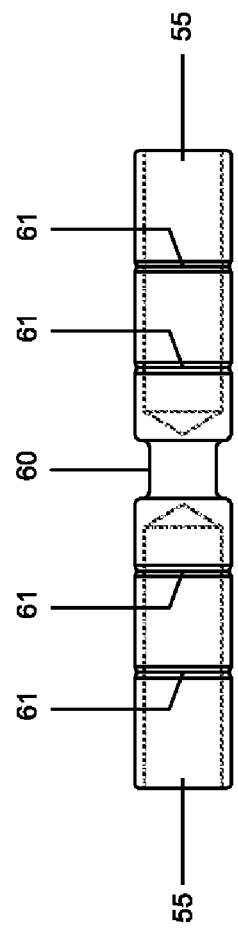
Fig. 5
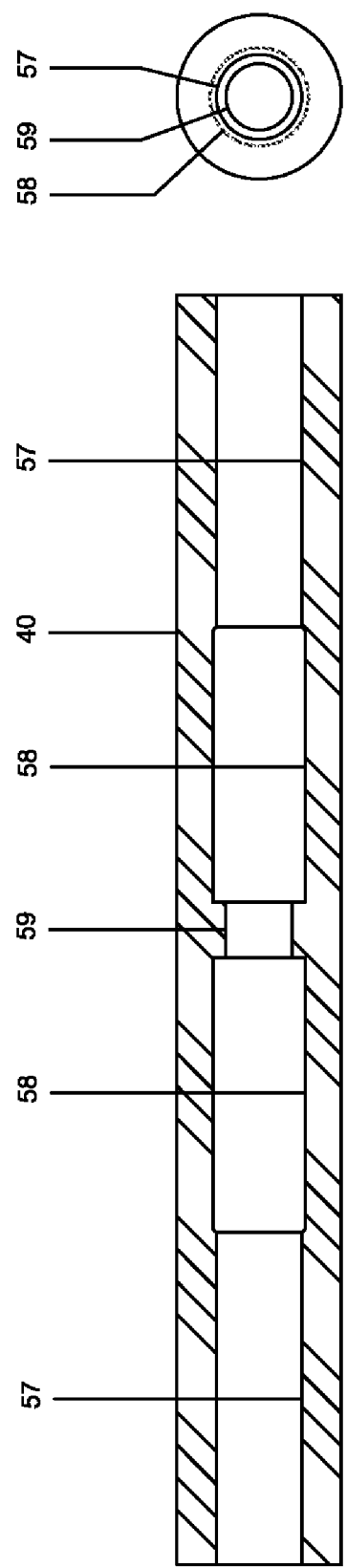
Fig. 6A
Fig. 6B

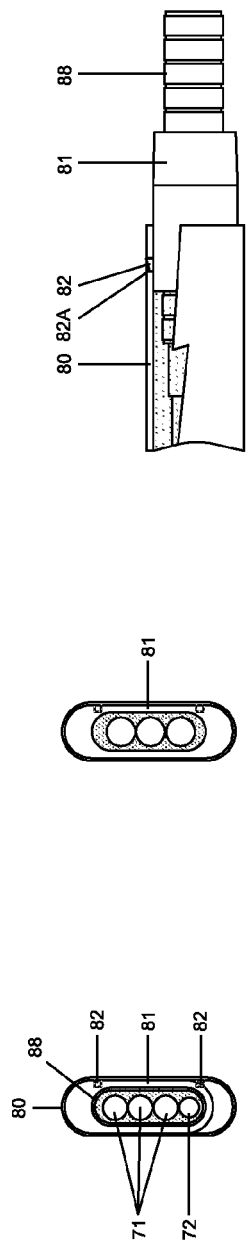
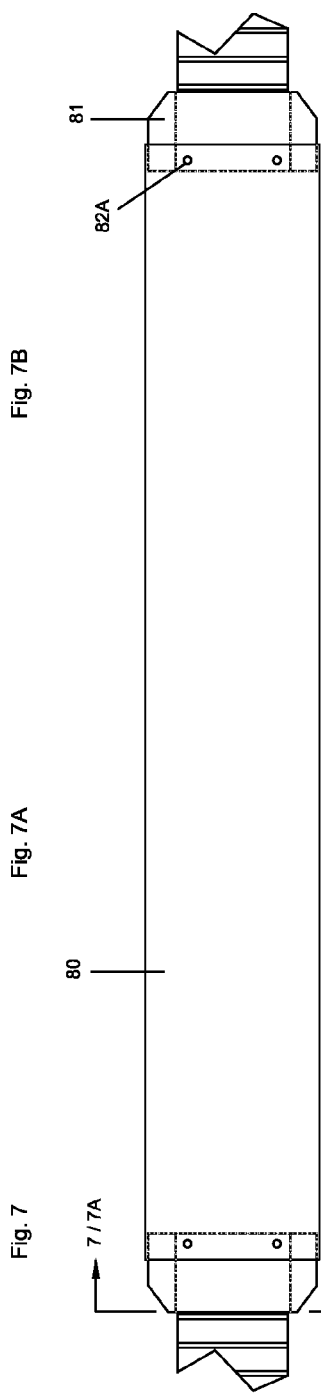
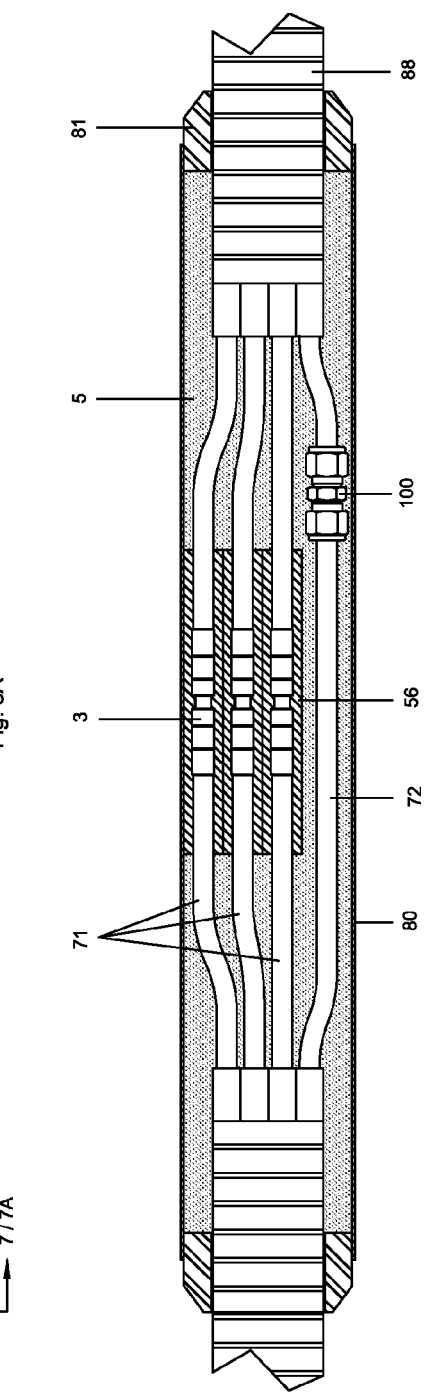

SEGMENTED DECOMPRESSION RESISTANT CABLE SPLICE AND METHOD OF INSTALLATION

This application claims priority to U.S. Provisional Application No. 61/025,328, filed Feb. 1, 2008.

The present invention relates generally to electrical power cable connection means found in underground wells to connect down hole electrical equipment to external power sources; and in particular, to a splice arrangement to join segmented conductors in a power cable which resists decompression failure.

BACKGROUND OF INVENTION

In the production of hydrocarbons from existing wells, it is often necessary to deploy high voltage, high amperage pumps, heaters and other types of electrical equipment in the well bore. Given the expense of modern drilling and production equipment, the ability to splice two cables together quickly and efficiently to install or to continue use of the electrical equipment in the well bore is crucial to the efficient production from the well.

Presently, splicing electrical cables together requires a technician to strip, crimp and hand wrap each electrical conductor to its complementary conductor and then to wrap the entire assembly with protective insulating sealing tape. Because of the bulk of the wrapping, splices on individual conductors were often staggered thereby permitting the overall width of the final splice to be thin enough to be inserted in the well bore. Splicing a cable in this manner, however, required five or more feet of cable to be exposed from the exterior armor protecting the cabling and required the galvanized armor to be rewound around the spliced portion to protect the splices. The high temperatures and pressures sustained by these splices led to early failures of the splice, which caused catastrophic arcing of the conductors through the wrapping on the splice. Gases penetrate the splice until the pressure of the dissolved gases in the intermolecular spaces of the materials and the pressure of the gases in the well bore reach an equilibrium condition.

Decompression occurs when the pressure outside the splice is reduced, causing the dissolved gases inside the splice to rapidly expand and thereby escape from the splice. Decompression results both from the reduction of the fluid column level height within the well resulting from pump activity; or, from cycling the well off for either pump-off control, or removal of the wellhead without sufficient time for the well to slowly decompress when pulling the conductor and pump system from the well for servicing. Rapid decompression, especially when exacerbated by repeated cycling, results in cracks in the cabling and in the splice, which can lead to failure of the splice or cable from expansion of the dissolved gases within the splice. Ideally, the splice should contain a connection that decompresses without trapping entrained gases causing tears in the splice, thereby minimizing arcing from one conductor to another.

Splices have had a tendency to fail when the pump is shut down and pressure rapidly released on the well head, permitting entrained air and gases within the splices to decompress and blown the splice apart, causing the catastrophic arcing of the conductors. Because of these problems, the industry has long sought a cable splice assembly permitting rapid installation and which could be installed in wet weather, and which prevented premature arcing failure of the electrical conductors upon decompression of the well.

BRIEF SUMMARY OF AN EMBODIMENT OF THE INVENTION

This embodiment of the present invention relates to a decompression-resistant electrical power cable splice. More specifically, the present embodiment is a decompression resistant electrical conductor splice having three electrical crimp sockets providing a detent or groove on a circumferential surface of said socket, three elastomeric insulating/sealing segmented sleeves or boots providing a longitudinal opening through each said sleeve or boot and providing a circumferential ridge engaging said detent or groove on said electrical crimp socket; and, either a first transition collar and a second transition collar each having an opening for an electrical power cable, joined to cover the elastomeric segmented sleeve or a protective cover or sleeve with end caps; and having an epoxy sealant between each end of the three elastomeric insulating sealing segmented sleeves and each power cable spliced ends to sealingly engage the three elastomeric segmented sleeves within the conjoined first and second transition collars or a protective sleeve providing end caps. This decompression resistant electrical conductor can also provide an elastomeric, segmented sleeve having an cylindrical outer surface profile and rectangular inner surface profile providing a circular profile when engaged with one or more circular segmented sleeves. The rectangular surfaces of the circular segments mate, and can consist of three segmented sleeves which are joined to form a cylinder for three conductors, or alternatively, three segmented circular sleeves laid side by side and covered with epoxy putty. The three flat side-by-side segmented sleeves can also accommodate a capillary tube all of which is encased in a protective flat sleeve or cover after being encapsulated within epoxy putty extending from an armored end of one flat electrical cable to an opposing armored end of a second flat electrical cable.

In order to facilitate the installation process, the decompression resistant electrical conductor splice can further comprise a layer of dielectric grease which is applied to the conductor to coat between elastomeric segmented sleeve and the outer surface of the electrical crimp socket facilitating longitudinal placement of the electrical crimp socket in the interior of the elastomeric segmented sleeve. The presence of an interior ridge on the sleeve and a groove or detent on the electrical splice connector permits rapid and sure placement of the sleeve over the electrical splice connector.

The decompression resistant electrical conductor splice can be fabricated with segmented sleeves which provide a circumferential detent to join with the exterior surface of the electrical crimp socket containing a ridge to engage the detent of the sleeve.

The segmented sleeve can be preferably formed from a material having a dielectric strength greater than 18,000 V/mil; and having a Shore A Durometer Gage of between 65-70.

This applications also discloses a method of splicing high power electrical conductor cables from an external source to down hole equipment in an underground well comprising the steps of installing a first transition collar over an end of a first electrical power cable and a second transition collar over an end of a second electrical power cable; covering each electrical conductor on the first power cable with dielectric grease; inserting an elastomeric segmented sleeve on each greased electrical conductor; inserting stripped ends from the first and the second power cable into each end of an electrical crimp socket and crimping each side of the crimp socket to join each conductor of the first power cable to a compatible conductor of the second power cable; covering the crimped electrical crimp socket with dielectric grease and moving each segmented sleeve over the crimp socket to seat a circumferential ridge in said sleeve with a detent on said crimp socket; and, filing each interior space on each transition collar with epoxy and joining each collar to encapsulate the plurality of segmented sleeves within the conjoined transition collar assembly. Once the epoxy cures, the cable splice can be inserted into the well bore and will resist decompression because the interior of the splice is restrained from excessive circumferential movement by the protective sleeve or transition collars and from longitudinal movement by the affixation of the epoxy putty on both sides of the completed sleeve assembly whether in cylindrical profile or in flat profile.

BRIEF DESCRIPTION OF DRAWINGS

FIG. 1 is a cross section end view of an embodiment of a three piece circular segmented portion of a cable splice boot or sleeve.

FIG. 2 is a cross section side view of one piece of the three piece segmented cable splice sleeve.

FIG. 3 is a perspective view of a partially completed round to flat splice using the three piece segmented cylindrical cable splice sleeves and disclosing one sleeve prior to movement over the splice connector.

FIG. 4A is a perspective view of the three piece cylindrical segmented cable splice transitioning from a flat to round cable prior to moving the last boot or sleeve over the splice connector and covering said assembly with epoxy putty.

FIG. 4B is a second perspective view of arrangement showing the placement of epoxy putty on both sides of the cylindrical three piece cable splice assembly prior to completion of the assembly.

FIG. 4C is the third perspective view of the arrangement showing the protective transition collars or sleeves moved over the epoxy coated ends of the electrical cables to complete the splice.

FIG. 5 is a cross sectional view of an electrical crimp socket showing the detent or groove and the counter-bores for accepting electrical conductors in each end to form an electrical connection.

FIG. 6A is an end cross sectional view of the flat cable form of splice sleeve showing a circular cross sectional profile.

FIG. 6B is a side cross sectional view of the flat cable form of splice sleeve showing the recess and ridge permitting rapid and efficient assembly of the sleeve over the electrical crimp socket.

FIG. 7 is an end cross sectional view of the protective sleeve for use with the flat cable segmented splice assembly showing end-cap engagement means with three electrical conductors and a capillary tube.

FIG. 7A is an end cross sectional view of the protective sleeve showing three conductor embodiment of the invention.

FIG. 7B is a partial cut-away side view of the end cap engaging the sleeve and showing the tang or barb engaged in the hole provided in the sleeve.

FIG. 8 is a cross-sectional view of the flat cable segmented splice assembly showing the end caps with three electrical conductors and a capillary tube connection through a Swagelock connector.

FIG. 8A is a top plan view of the flat cable splice sleeve showing a recess or hole in the flat cable splice sleeve for engaging the tang or barb on each end cap.

DETAILED DESCRIPTION OF AN EMBODIMENT OF INVENTION

Figure 9:
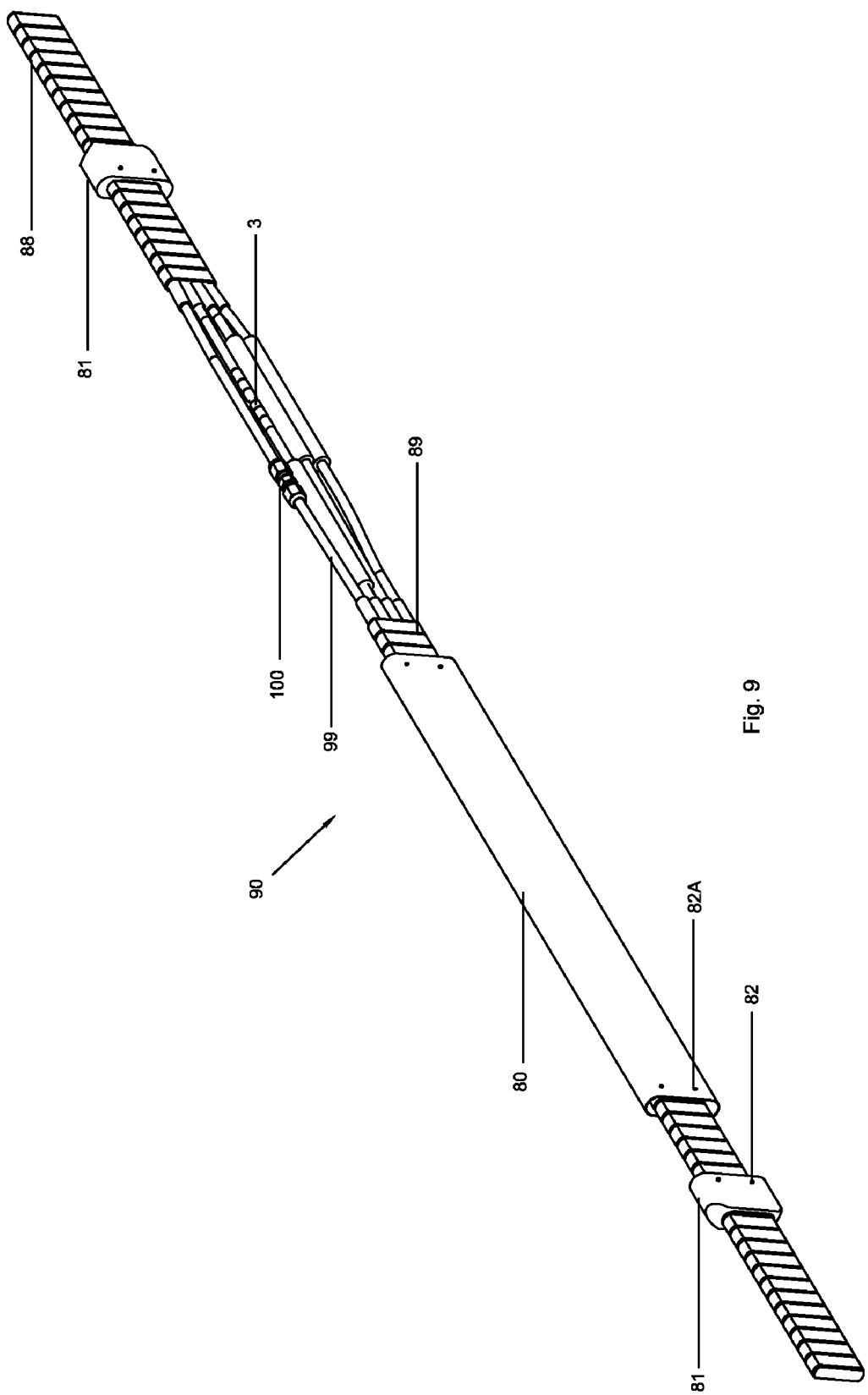
FIG. 9 is a perspective view of an partially assembled flat cable splice assembly of the present invention accommodating a capillary tube transition within the protective sleeve of a flat cable splice.

The present embodiment of the invention relates to an electrical cable splice to permit efficient sealed connections for power cables for down hole electrical service, which resists failure when a well is permitted to rapidly decompress. The oil and gas industry has long sought a cable splice which is both easily installed and which will survive the decompression which often occurs when an electrical submersible pump is rapidly cycled or pulled to service the well or pump. Assignee from Applicant previously filed U.S. application Ser. No. 11/581,956, which is incorporated herein by reference for all purposes on a cable splice which consists of a unitary rubber splice. Although successful in application, the splice requires substantial effort to move the three spliced conductors into the unitary sleeve. Accordingly, a segmented electrical splice has been developed which permits rapid assembly on a well site by a technician, and which does not require substantial wrapping of the electrical splice; yet, provides substantial protection from decompression failure for the splice. The prior application further provided an intermediate protective sleeve joining each transition collar. The present invention permits the segmented cable splice to be completely enclosed within one of the transition collars thereby eliminating the need for the protective sleeve of the prior application further minimizing the time spent in installing this splice on the rig floor. The present invention also provides for a completely flat transition consistent with flat conductor cabling permitting the use of this decompression resistant splice for flat cable installation and flat cable bundles having a capillary tube to accommodate the capillary tube within the protective sleeve of the present invention. The present invention thereby provides for a splice to accommodate a capillary tube transition within the protective sleeve of the flat cable splice when required. Prior art capillary tube splices normally required the capillary tube to be moved out of the protective enclosure of the splice because of the bulk of the wrapping required to prevent arcing upon decompression. With the present embodiment, the capillary tube can be connected and remain within the protective sheathing of the conjoined cable assembly.

FIG. 1 shows a cross-sectional view of one section of the three-pieced circular segmented electrical splice boot, reflecting longitudinal passage 43 providing an arcuate outer surface 44 and having substantially planar inner surfaces 41. Combining three similar circular segmented boots forms a cylinder enclosing three electrical conductors, each spliced together with a crimp splice connector, more fully shown in FIG. 5.

FIG. 2 is a cross sectional view of the electrical splice boot 40 of FIG. 1 reflecting the interior recess 57 and ridge 59 permitting easy centering of a crimp splice connector having a central detent or groove (not shown in this view, but shown in FIG. 5 as groove 60). The splice boot 40 further provides an interior cavity 58 for seating and centralizing the cable splice connector. The inner recess 57 has an inner diameter (ID) slightly smaller than the ID of the splice boot and approximately 0.002" (0.0508 mm) smaller than the conductor ID which is to be crimped and held in the sleeve. As will be more fully discussed herein, the central recess 57 and ridge 59 permit rapid insertion of the splice connector within the boot 40 on each conductor of the splice and a tactile feedback to the technician upon seating within the groove 60 of FIG. 5 of the ridge 59.

FIG. 3 shows a perspective view of a partially assembled segmented splice arrangement, which can be utilized for three-phase electrical service from a flat cable arrangement 8 to a round cable arrangement 9, although a round to round splice can be readily accomplished in the same manner as shown herein without departing from the spirit of this invention. Once each of the splice boots which are shown as 2A, 2B and 2C in this view, are inserted on the separated conductors which have been crimped together using a crimp splice connector 3 with the detent or groove, the conductor and crimp splice connector are covered in a high dielectric grease and the splice boot 2A is then moved over the conductor and the crimp splice connector until the interior ridge seats in the groove or detent. See FIG. 2, detent 59. After the third segmented splice boot 2A is moved into place, the profile of the conductor splice is cylindrical. Epoxy putty is applied around each end of the splice boot assembly and extends back onto the armored portion of each conductor cable assembly. The transition collars 1, 6 are then moved over the encapsulated electrical conductors and epoxy putty and the splice boots to provide a mechanical support to the exterior arcuate edges of the three segmented splice boots against lateral expansion upon decompression and permitting the epoxy putty to prevent longitudinal movement of the splice boot sleeves 2 during decompression. A portion 4 of the flat transition collar 6 can be flared to provide a sleeve that engages and permits seating of the round transition collar 1.

Each of the segmented sections can be fabricated from ethylene propylene diene monomer (EPDM) rubber. The EPDM rubber used can be Centrilift compound #CL177E or Eagle Elastomer, Inc. compound #EE66465A. It is believed that a medium viscosity fluoroelastomer obtained from Solvay Solexis named Tecnoflon® BR 9151 can also be substituted for the EPDM rubber described above. The elastomer used should have a Shore A Durometer Gage minimum value of between 65-70 and a dielectric strength of at least 18,000 V/mil.

FIGS. 4A-4C are a composite perspective view of the flat to round cable splice assembly in various stages of assembly. FIG. 4A shows the circular segmented cable splice boot 2A providing cover for the crimp splice connector 3 with groove or detent for connecting the last of the three conductors in preparation for completion of the splice. Crimp splice connectors within splice boots 2B and 2C have—in this view—already been assembled. FIG. 4B shows the cable splice assembly after moving the last boot or sleeve 2A over the crimp splice connector 3 (as shown in FIG. 4A) and the installation of the encapsulating epoxy putty 5 at each end of the cable splice boot assembly thereby preventing longitudinal movement of the boots upon decompression. FIG. 4C shows the two transition collars 6, 1 engaged in the flared edge 4 of collar 6 moved over the cable splice and epoxy filled ends ready to be banded to the production string of the electrical submersible pump or other electrical service being provided in the well bore.

FIG. 5 is a cross sectional view of the crimp splice connector 3 with central groove or detent 60 to allow easy movement and placement of the boot sleeve over such connector. The crimp splice connector 3 is fabricated from full hard oxygen free copper alloy, C10100 or C10200, which is cleaned after machining of a counterbore 55 on each end of the connector 3 to a depth of approximately 1.125" and which is free of cracks, crevices or shavings which might inhibit proper plating. The exterior surface of each end of the crimp splice connector 3 is grooved or scored 61 to provide a visual and tactile guide to the installer where the crimping tool can be placed. Each crimp splice connector 3 is then plated with nickel or gold and hand inspected to assure proper plating.

If the gold flakes from the connector in test crimps, the batch is rejected and replated. Each connector used is machined to accept solid, stranded or compact cable having AWG (American Wire Gage) gages from 1-6 by varying the ID of the crimp splice connector 3. The outer diameter (OD) of each crimp splice connector 3 is uniform and designed to fit the EPDM sleeve 2 of the three piece circular segmented sleeve or cylinder configuration (as shown in FIGS. 3 and 4) or the flat cable segmented configuration (shown in FIGS. 8 and 9) to be discussed below.

FIG. 6A is a cross-sectional end view of a segmented electrical splice boot intended to be used on a flat cable splice system showing the interior diameter (ID) 59 of the detent, the ID of the interior cavity 58 for seating the crimp splice connector, and the interior of the boot 57 to snugly grip the conductor spliced together with the crimp splice connector (not shown in this view). FIG. 6B is a cross-sectional side view of the flat cable splice system showing again the ID recess 59 and ridge for insertion of the conductor and splice connector into the central portion of the segmented boot, the ID crimp splice body portion or cavity of the boot 58 and the conductor ID cover 57, differing from the segmented sleeve boot shown in FIG. 2 in its cross-sectional end view.

FIG. 7 is a cross sectional end view of the approximately twenty-one inch extruded flat cable sleeve which is intended to cover the spliced three conductor set 71, including where needed, a capillary tube 72.

As shown in FIG. 8, a capillary tube 72 can be connected with a swaged connection 100, wholly within the protective sleeve 80 of the present invention thereby hindering decompression of the cable splice and damage to the capillary tube connection while permitting all three electrical conductors to lay side by side. Each of the conductors is inserted into the crimp splice connector 3 and the boot 56 for each moved, after coating with the dielectric grease, over the connector as done with the round segmented sleeve assembly. The three conductors, and the capillary tube if present, are then covered in epoxy putty and the end caps 81 are moved over to seal the entire assembly in the sleeve 80. This embodiment permits the rapid and easy deployment of the three electrical conductors and the capillary tube in a protective easily installed flat cable splice sleeve in a relatively short space.

FIG. 7B shows the end cap 81 providing a barb or pin or tang 82 on its exterior surface which engages in the hole 82A of the sleeve 80 to snap each end cap into engagement with the sleeve and the underlying epoxy putty (not seen in this view). This engagement snap provides both a visual and audible feedback to the technician thereby assuring rapid assembly of the cable splice.

As shown in FIG. 8A, an end cap 81 is provided on each end of the flat cable splice system sleeve 80, each of which end caps (as shown in FIG. 8A) have a barb or tang 82 which snaps into either a recess or a hole 82A in the sleeve 80 to provide both a visual and auditory feedback that the end cap has seated in a recessed portion 84 of the sleeve. Prior to closing the opposing end caps, the entire assembly is encapsulated in epoxy putty 5 in FIG. 8 and the assembly is closed.

FIG. 9 shows the partially assembled flat cable splice assembly 90 (without the end caps) reflecting the relative position of each of the elements during assembly and before installation of the encapsulating epoxy. In this figure, the capillary tube 99 is also shown together with Swagelok fittings 100, but could be easily removed without departing from the spirit of the invention. Since the sleeve 80 provides sufficient room to enclose both the capillary tube with the conductor bundle, the capillary tube is not required to be moved out of the protective cover of the armor when it is placed into the well. Epoxy would be placed around the entire assembly and over the edge of each of the armored cables 88 and 89. The sleeve 80 and end caps 81 would be moved into place and locked into position and the epoxy allowed to cure. At that point, the flat cable splice could be banded to the production string and moved into the well bore. Once encapsulated, the decompression experienced by each of the conductor would be restrained within the protective sleeve 80.

The length of the protective sleeve around the flat cable splice assembly is around 21" (53.54 cm) while each end cap on this embodiment 90 is approximately 1% ½ "(3.81 cm) making the entire assembled flat cable splice 24" (60.96 cm) long. The round or cylindrical embodiment can be spliced together in approximately 18" (45.72 cm), making either assembly much shorter than prior art cable splice assemblies which typically ran between three to five feet (1.524 m) in length. This facilitates both rapid assembly of each splice and permits banding of the spliced cable to provide more support for the spliced connection since the banding retains the cables to the production tubing more compactly. The compact size of either embodiment of this invention, the ease of installation, and the resistance to explosive decompression when well pressure rapidly changes prolongs the useful life of this cable splice making this cable splice highly desirable for the production of oil from gassy and troublesome wells.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A decompression resistant electrical conductor splice comprising:
   a plurality of electrical crimp sockets provided with a detent on a circumferential surface of each socket;
   a plurality of elastomeric segmented sleeves provided with a longitudinal opening through each sleeve and provided with a circumferential ridge engaging said detent on each electrical crimp socket wherein at least three segmented sleeves are aligned in a flat; and,
   a protective covering extending between two armored electrical cables to be spliced together covering the elastomeric segmented sleeves and preventing lateral circumferential expansion of each sleeve upon decompression and having an epoxy sealant between ends of each of the elastomeric segmented sleeves and each armored electrical cable to restrain the elastomeric segmented sleeves from movement upon decompression within the protective covering.

2. The decompression resistant electrical conductor splice of claim 1 wherein the at least three segmented sleeves are combined with a capillary tube.

3. The decompression resistant electrical conductor splice of claim 1 further comprising a layer of dielectric grease between each elastomeric segmented sleeve and the outer surface of each electrical crimp socket facilitating longitudinal placement of the electrical crimp socket in the interior of each elastomeric segmented sleeve.

4. The decompression resistant electrical conductor splice of claim 1 wherein each segmented sleeve is a material formed having a dielectric strength greater than 18,000 volts per mil.

5. The decompression resistant electrical conductor splice of claim 1 wherein each segmented sleeve is formed of a material having a durometer rating around 70 on Shore A Gage.

6. A decompression resistant electrical conductor splice comprising:
   a plurality of electrical crimp sockets provided with a detent on a circumferential surface of each socket;
   a plurality of elastomeric segmented sleeves provided with a longitudinal opening through each sleeve and provided with a circumferential ridge engaging said detent on each electrical crimp socket wherein at least three segmented sleeves are joined to form a cylinder; and,
   a protective covering extending between two armored electrical cables to be spliced together covering the elastomeric segmented sleeves and preventing lateral circumferential expansion of each sleeve upon decompression and having an epoxy sealant between ends of each of the elastomeric segmented sleeves and each armored electrical cable to restrain the elastomeric segmented sleeves from movement upon decompression within the protective covering.

7. The decompression resistant electrical conductor splice of claim 6 further comprising a layer of dielectric grease between each elastomeric segmented sleeve and the outer surface of each electrical crimp socket facilitating longitudinal placement of the electrical crimp socket in the interior of each elastomeric segmented sleeve.

8. The decompression resistant electrical conductor splice of claim 6 wherein each segmented sleeve is a material formed having a dielectric strength greater than 18,000 volts per mil.

9. The decompression resistant electrical conductor splice of claim 6 wherein each segmented sleeve is formed of a material having a durometer rating around 70 on Shore A Gage.

10. A method of splicing high power electrical conductor cables from an external source to down hole equipment in an underground well comprising:
    installing a first transition collar over an end of a first electrical power cable and a second transition collar over an end of a second electrical power cable;
    covering each electrical conductor on the first power cable with dielectric grease;
    inserting an elastomeric segmented sleeve on each greased electrical conductor;
    inserting stripped ends from the first and the second power cable into each end of an electrical crimp socket and crimping each side of the crimp socket to join each conductor of the first power cable to a compatible conductor of the second power cable;
    covering the crimped electrical crimp socket with dielectric grease and moving each segmented sleeve over the crimp socket to seat a circumferential ridge in said sleeve with a detent on said crimp socket; and,
    filing each interior space on each transition collar with epoxy and joining each collar to encapsulate the plurality of segmented sleeves within the conjoined transition collar assembly.

11. The method of claim 10 further comprising:
    curing the epoxy;
    inserting the conjoined cable splice collar assembly and cable into a well bore;
    and,
    energizing the electrical service through the cable splice.

* * * * *